United States Patent [19]

Exley et al.

[11] 4,182,117
[45] Jan. 8, 1979

[54] DIFFUSER VANE CUSP BLEED APERTURE WITH AUTOMATIC EJECTOR CONTROL DEVICE

[75] Inventors: John T. Exley, Milford; Charles Kuintzle, Monroe, both of Conn.

[73] Assignee: Avco Corporation, Stratford, Conn.

[21] Appl. No.: 867,893

[22] Filed: Jan. 9, 1978

[51] Int. Cl.² ............................ F02C 7/32; F04B 23/08
[52] U.S. Cl. ................................ 60/39.07; 415/211; 417/80; 417/189
[58] Field of Search ............ 60/39.07, 39.09 D, 39.33; 415/207, 211, 115, 112; 417/80, 184

[56] References Cited

U.S. PATENT DOCUMENTS

| | | | |
|---|---|---|---|
| 3,527,054 | 9/1970 | Hemsworth | 60/39.08 |
| 3,706,510 | 12/1972 | O'Connor | 415/207 |

FOREIGN PATENT DOCUMENTS 1199042  12/1959  France .................................. 60/39.07

*Primary Examiner*—Louis J. Casaregola
*Attorney, Agent, or Firm*—Ralph D. Gelling

[57] ABSTRACT

In a gas turbine engine an auxiliary airflow is provided to power accessories. This auxiliary airflow is obtained from a bleed aperture which is constructed immediately downstream of a diffuser vane in a cusp which is formed in the trailing edge of the vane to provide inertial separation. This high energy air from the diffuser is used as the primary airflow in an ejector to draw ambient air into the auxiliary airflow to lower the temperature of the bleed air. The ejector is constructed to automatically adjust the amount of ambient air according to the energy of the bleed airflow by means of a piston actuated spike mounted for sliding movement in the primary nozzle. The spike varies the volume of flow through the primary nozzle according to the pressure exerted by the airflow on the piston.

3 Claims, 3 Drawing Figures

DIFFUSER VANE CUSP BLEED APERTURE WITH AUTOMATIC EJECTOR CONTROL DEVICE

BACKGROUND OF THE INVENTION

In some instances it is necessary in a gas turbine engine to have a source of airflow to perform auxiliary functions and drive accessory devices; for example, to generate electricity, drive air conditioning, and to pressurize passenger areas. In general, this airflow must be free of contamination and is supplied from bleed air obtained at various locations in the engine. Depending on the stage at which the bleed air is obtained, various problems occur; namely, contamination, insufficient energy, excessive energy loss within the engine itself or excessive temperature of the bleed air. It is, therefore, the object of this invention to obtain high energy auxiliary airflow while minimizing contamination and controlling the temperature of the auxiliary airflow without serious loss of engine power.

Another object is to provide an ejector assembly constructed to provide a secondary airflow which varies inversely proportional to the pressure in the primary nozzle.

SUMMARY OF THE INVENTION

In a gas turbine engine, having an annular diffuser connected to a centrifugal compressor stage, radially extending vanes are constructed having a curved cusp formed in the trailing edge of this vane. A bleed air aperture is located within the cusp to supply high energy air to an auxiliary system. The cusp is formed to create inertial separation of contaminants from the bleed air. This auxiliary airflow forms the primary airflow of an ejector nozzle having a resiliently biased nozzle spike which is movable to vary the amount of primary airflow. Adjustment of the spike is caused by changes in pressure within the bleed air duct. The cooler ambient air forms the secondary airflow of the ejector and combines with the primary airflow to lower the temperature thereof. In this manner, a high energy, temperature controlled, auxiliary airflow is provided. The spike is connected to a piston which slides in a chamber which is subject to the pressure in the primary nozzle. The piston is spring biased to provide maximum primary airflow.

BRIEF DESCRIPTION OF THE DRAWING

This invention is described in more detail below with reference to the appended drawing in which.

DETAILED DESCRIPTION OF THE INVENTION

Figure 1:
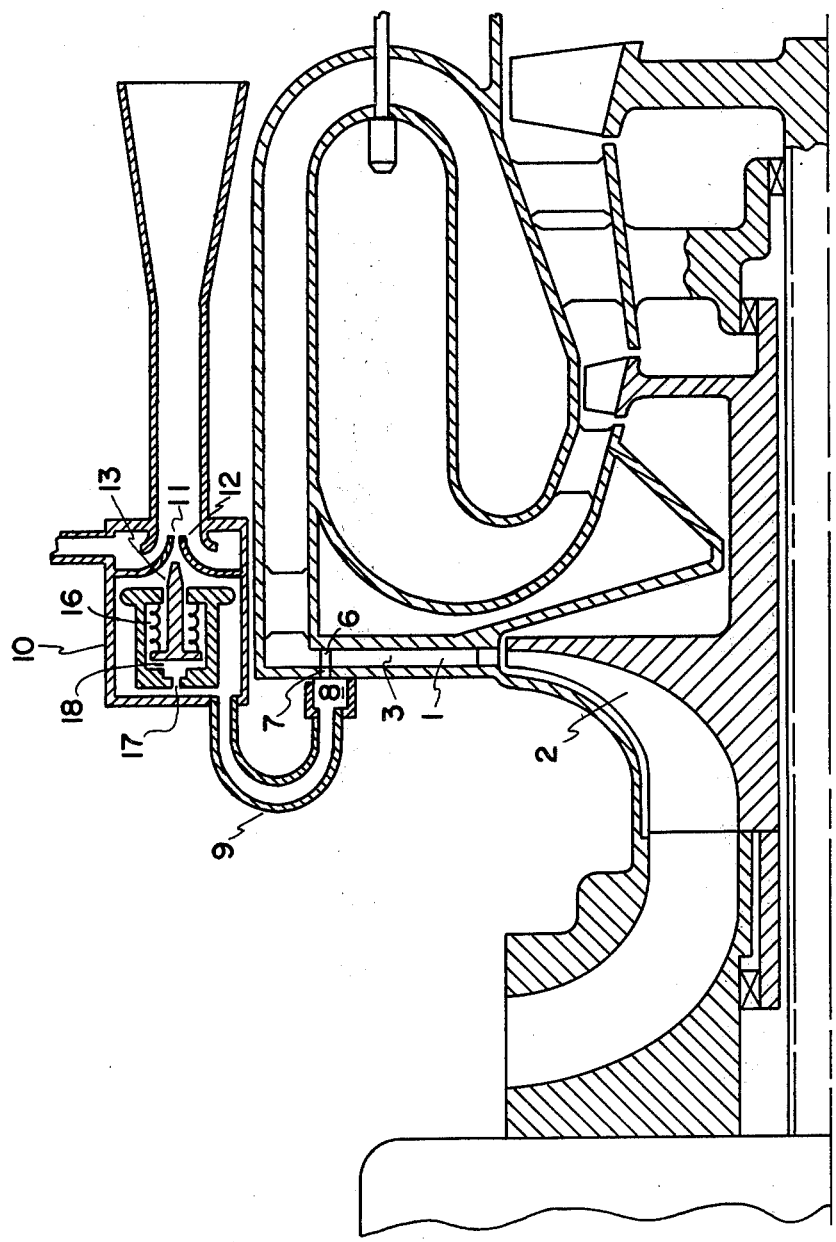
FIG. 1 is a sectional view of a gas turbine engine incorporating the subject invention.
Figure 2:
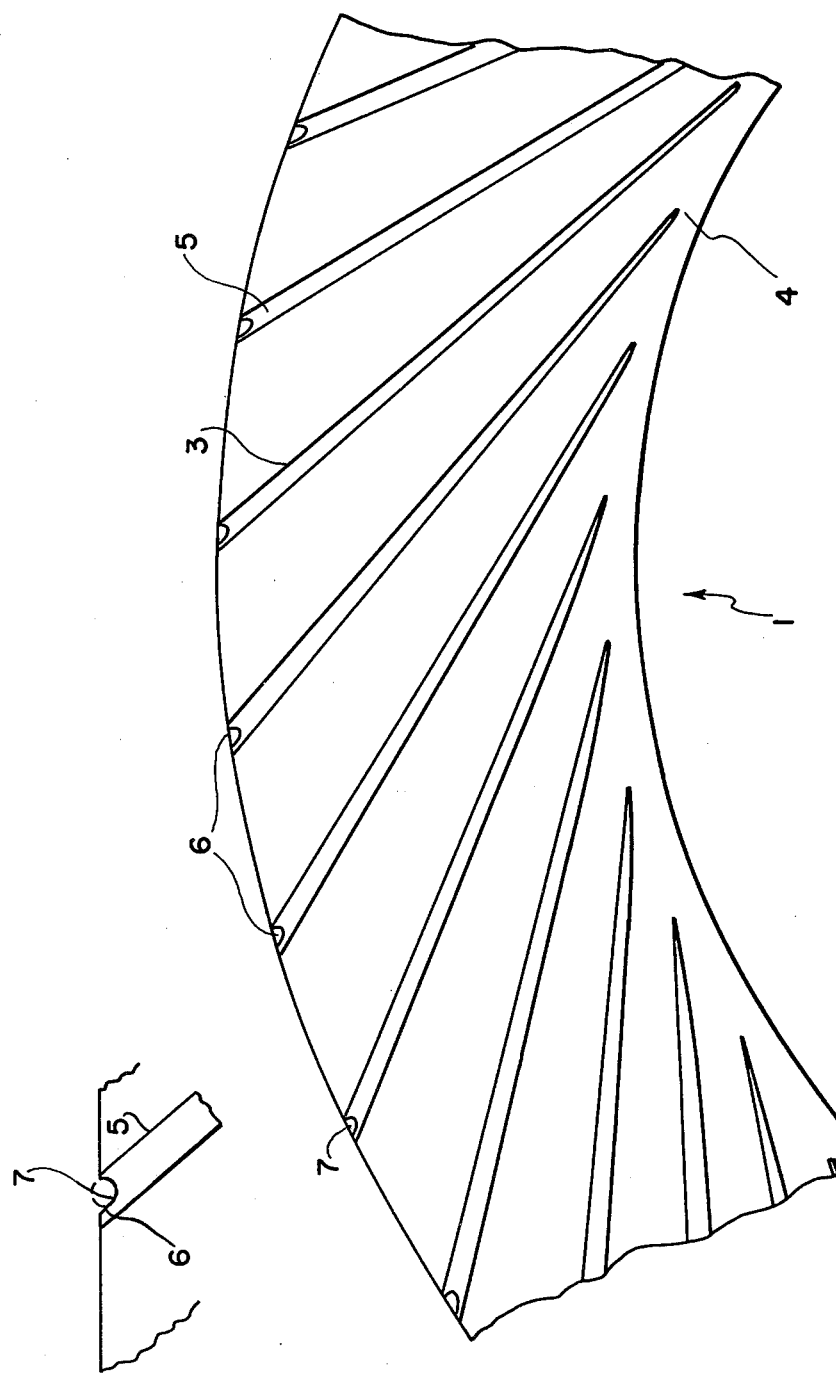
FIG. 2 is a partial side view of the diffuser showing the diffuser vanes of this invention and the cusp and bleed aperture magnified.

In a gas turbine engine an annular diffuser 1, as shown in FIGS. 1 and 2, receives high energy airflow from a centrifugal compressor impeller 2. The diffuser 1 is constructed with radially extending vanes 3 constructed across the diffuser channel. The vanes 3 gradually expand in width from their forward edge 4 to the downstream edge 5. A curved cusp 6 is machined into the trailing edge 5 of the diffuser vane 3 in order to minimize the wake caused by the vane 3 and to induce a vortex at the trailing edge 5. A bleed aperture 7 is constructed in the wall of diffuser 1 within the cusp 6 in the trailing edge 5 of the diffuser vane 3. The bleed aperture 7 connects to a bleed flow manifold 8 and is designed to allow high energy air within the cusp region of the diffuser vane 3 to flow into the bleed manifold 8.

Figure 3:
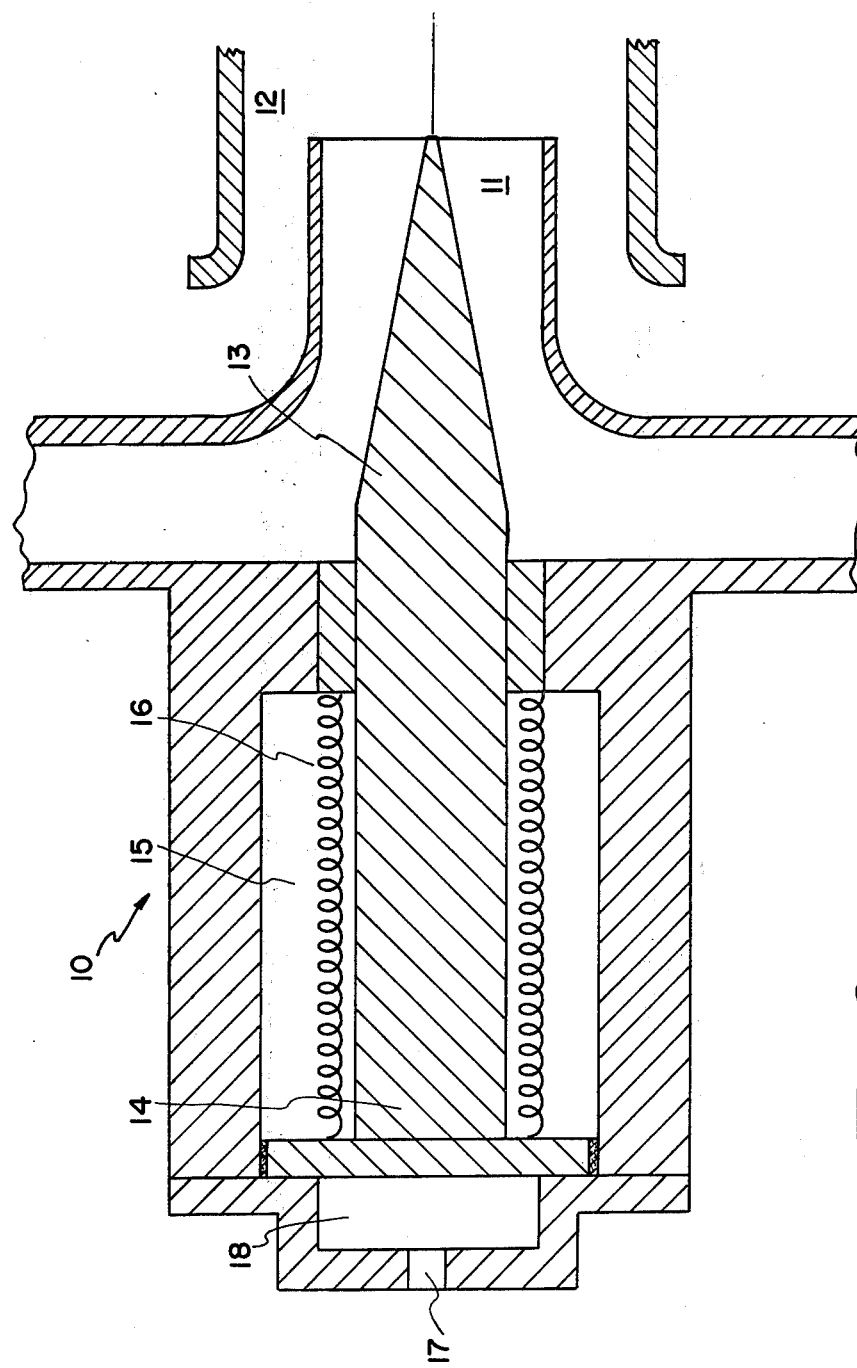
FIG. 3 is a sectional view of the ejector nozzle associated with this invention.

An auxiliary airflow duct 9 communicates directly with the bleed manifold 8. An ejector nozzle assembly 10, as shown in FIG. 3, is constructed in the auxiliary duct 9 so that the bleed air forms the primary flow through the primary nozzle 11 of the ejector 10. Cooler ambient air is obtained from outside of the engine through the secondary nozzle 12 of the ejector 10. The primary nozzle 11 is controlled by a spike 13 which is axially movable within the nozzle 10. The rearward portion 14 of the spike 13 is formed as a piston which translates within a closed chamber 15. The piston 14 is biased by spring 16 to provide maximum primary airflow. The pressure in the bleed manifold 8 forces air through opening 17 into well 18 of chamber 15 and exerts a force on one side of the piston 14 against the biasing spring 16 to cause movement of the spike 13 to reduce the primary airflow, thereby controlling the ratio of the primary to the secondary air.

In operation high energy air exits through the bleed aperture 7 at the trailing edge 5 of the diffuser vane 3 and enters the bleed manifold 8 which supplies the auxiliary duct 9. At low engine speeds the bleed air is at relatively low energy and the ejector nozzle 10 is set for maximum primary flow essentially eliminating the introduction of ambient air. As engine speeds increase the higher energy bleed air exerts a force on the spike 13 against its biased spring 16 to translate the spike 13 in a direction which reduces the amount of primary air flowing in the primary nozzle 11. As this happens secondary airflow increases causing an auxiliary airflow of reduced temperature suitable to driving accessory devices.

The curved surface of the cusp 6 constructed in the trailing edge 5 of the diffuser vane 3 requires the bleed airflow to turn sharply in order to exit through the aperture 7. This creates a centrifugal inertial separation effect which substantially eliminates contaminants in the bleed air stream, thereby eliminating the need for further separation or filtering of the auxiliary airflow.

According to the above description, the following invention is claimed as novel and is desired to be secured by Letters Patent of the United States.

1. In a gas turbine engine having a compressor stage which drives high energy airflow through a diffuser, means to bleed air from the diffuser comprising:
   a plurality of diffuser vanes mounted in the diffuser and having a curved cusp-like surface formed in the trailing edge thereof;
   a connecting duct constructed in the diffuser and communicating with the region within the cusp formed in the downstream end of the diffuser vane; and
   a bleed air manifold constructed to receive bleed air from the connecting duct.

2. In a gas turbine engine means to bleed air from the diffuser as described in claim 1, further comprising an ejector assembly having a primary and a secondary nozzle, said assembly being connected to the bleed air manifold so that the bleed air flows through the primary nozzle, said nozzle being constructed with means to automatically adjust the volumn of airflow in the primary nozzle inversely proportional to the energy of the airflow in the diffuser, said ejector assembly connected to draw cooling air through the secondary nozzle to combine with the bleed airflow.

3. In a gas turbine engine means to obtain bleed air from the diffuser as described in claim 2 wherein the means to vary the airflow in the primary nozzle of the ejector comprises:

an elongated spike mounted for axial sliding motion within the primary nozzle and shaped so that this motion tends to vary the amount of airflow in the primary nozzle;

a sealed chamber constructed within the ejector;

a piston fixed to the nozzle spike for movement therewith and extending into the sealed chamber;

a biasing spring operatively associated with the piston to bias the piston and spike in a position for maximum primary airflow; and means to expose one side of the piston to a force proportional to the pressure of the bleed air in the bleed manifold so that increased pressure will cause movement of the piston and spike to reduce the primary airflow.

* * * * *

UNITED STATES PATENT AND TRADEMARK OFFICE
CERTIFICATE OF CORRECTION

PATENT NO. : 4,182,117
DATED : January 8, 1980
INVENTOR(S) : John T. Exley, Charles Kuintzle, Jr.

It is certified that error appears in the above-identified patent and that said Letters Patent are hereby corrected as shown below:

Please change the issue date of the patent appearing on the title page of the Letters Patent from "January 8, 1979" to -- January 8, 1980 --.

Signed and Sealed this

Thirteenth Day of May 1980

[SEAL]

Attest:

SIDNEY A. DIAMOND

Attesting Officer

Commissioner of Patents and Trademarks